United States Patent [19]

Jackson

[11] 4,157,862
[45] Jun. 12, 1979

[54] CABLE KIT FOR MAKING A REMOTE CONTROLLED TRUCK MIRROR

[76] Inventor: Raymond Jackson, 3305 Pine Valley Rd., Columbus, Ohio 43219

[21] Appl. No.: 882,335

[22] Filed: Mar. 1, 1978

[51] Int. Cl.² .............................................. G02B 5/08
[52] U.S. Cl. ................................. 350/303; 74/501 M
[58] Field of Search ...................... 350/288, 289, 303; 74/501 M, 501 R

[56] References Cited

U.S. PATENT DOCUMENTS

| 2,330,444 | 9/1943 | Park | 74/501 M UX |
| 2,843,018 | 7/1958 | Cooper et al. | 74/501 R |
| 3,261,226 | 7/1966 | Dent | 74/501 R |
| 3,724,928 | 4/1973 | Olsen et al. | 74/501 M |
| 3,924,938 | 12/1975 | Carson | 74/501 M |
| 3,969,952 | 7/1976 | McKee et al. | 74/501 M |

Primary Examiner—F. L. Evans

[57] ABSTRACT

A kit for converting a conventional truck side view mirror, so that it can be remotely controlled in adjustment by the truck driver within the truck cab; the kit including a flexible cable which, at one end, is attached to a pivotable side view mirror, and which, at its other end, extends into the interior of the cab, and under the dashboard, where it terminates with a manually controllable handle or knob, and intermediate portion of the flexible cable being grasped by guide means supported from the mirror tubular support.

6 Claims, 18 Drawing Figures

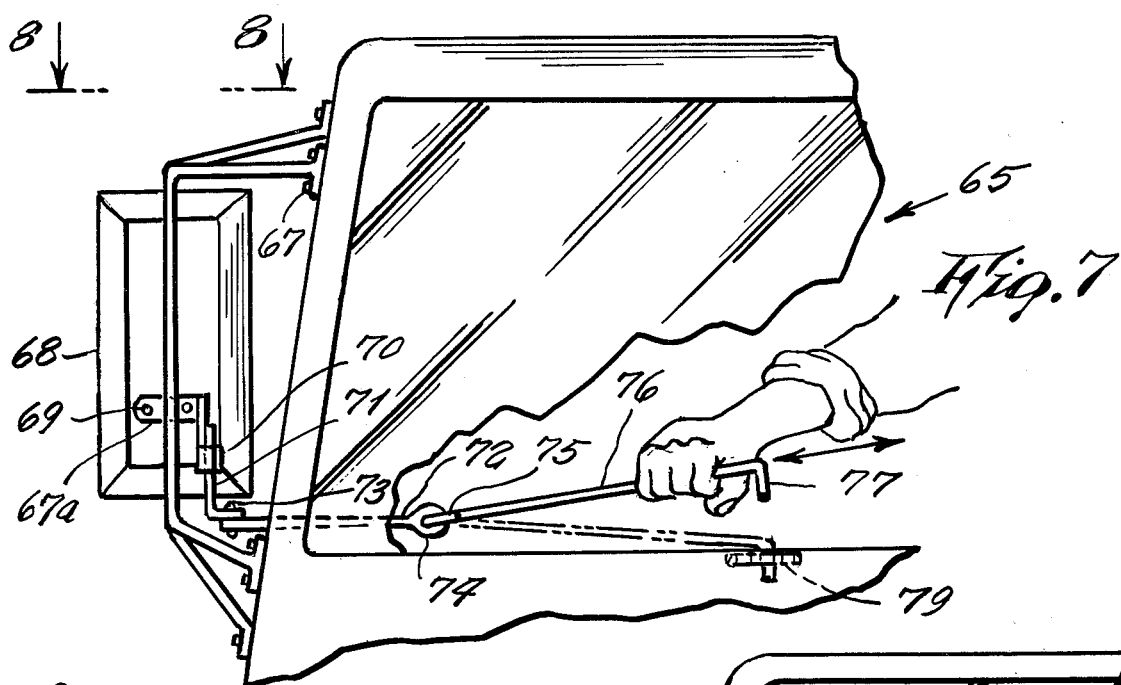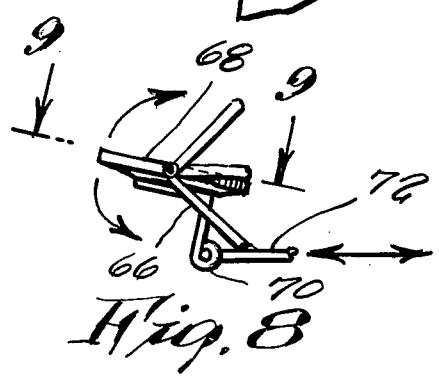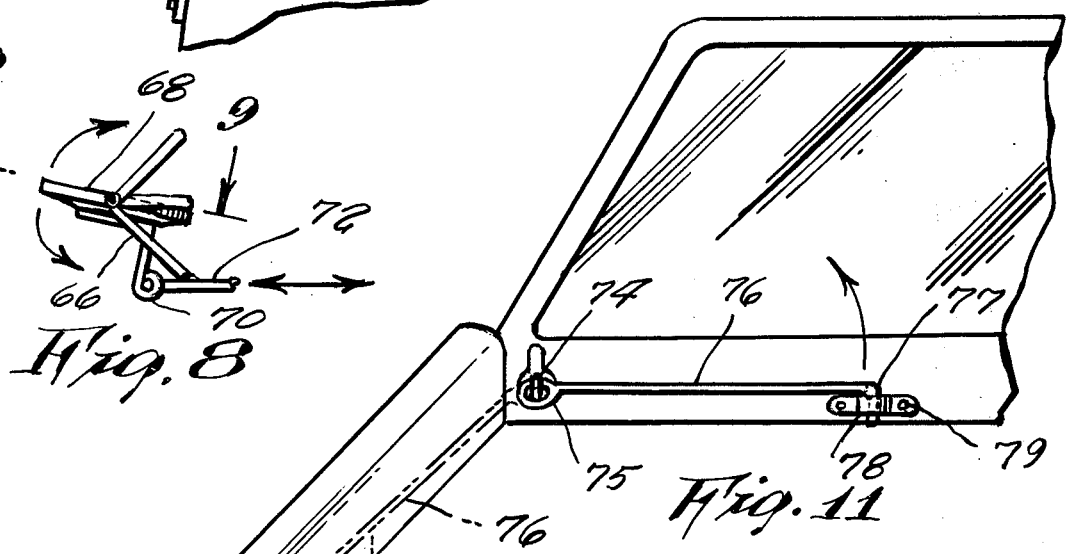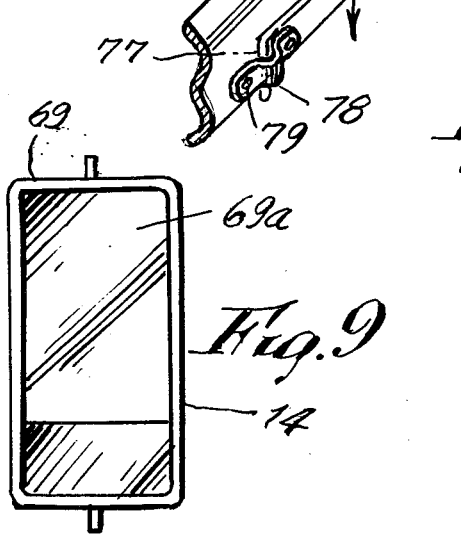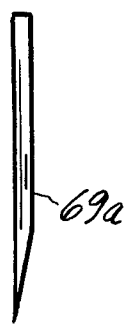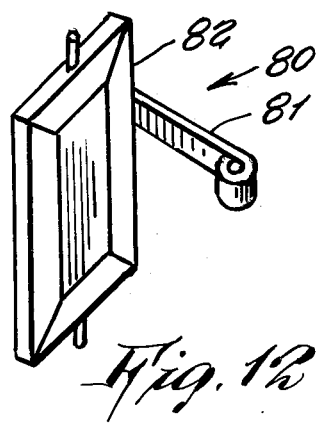

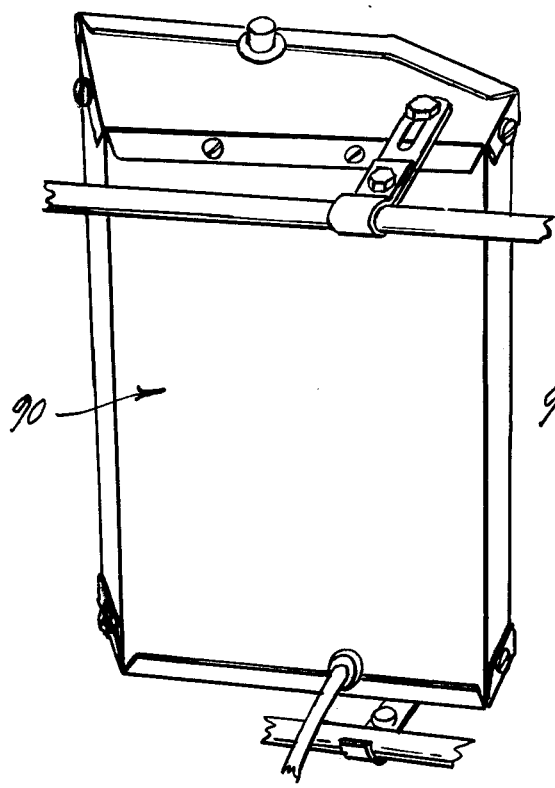
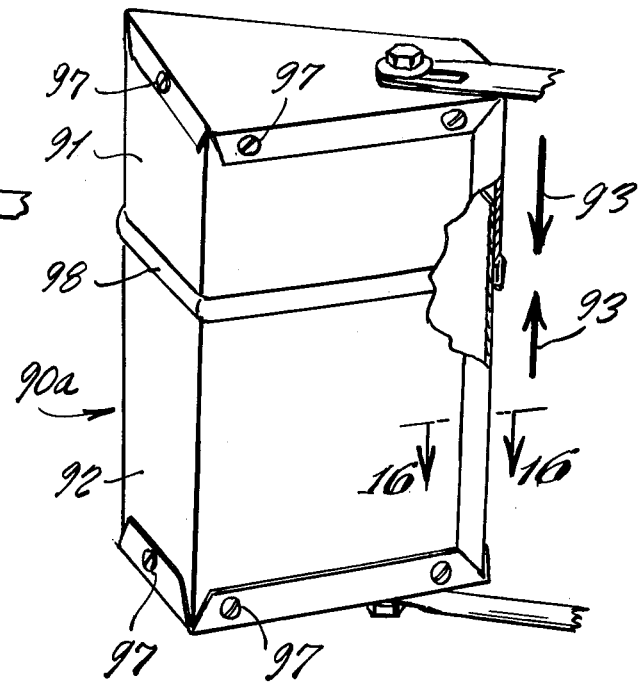
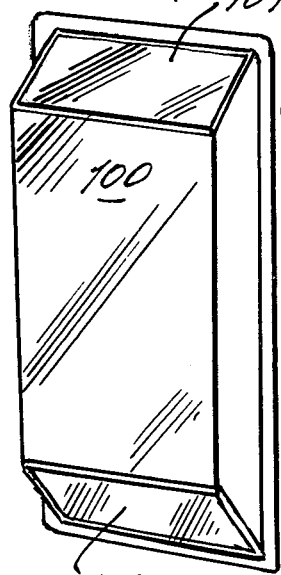
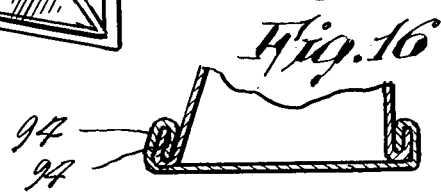
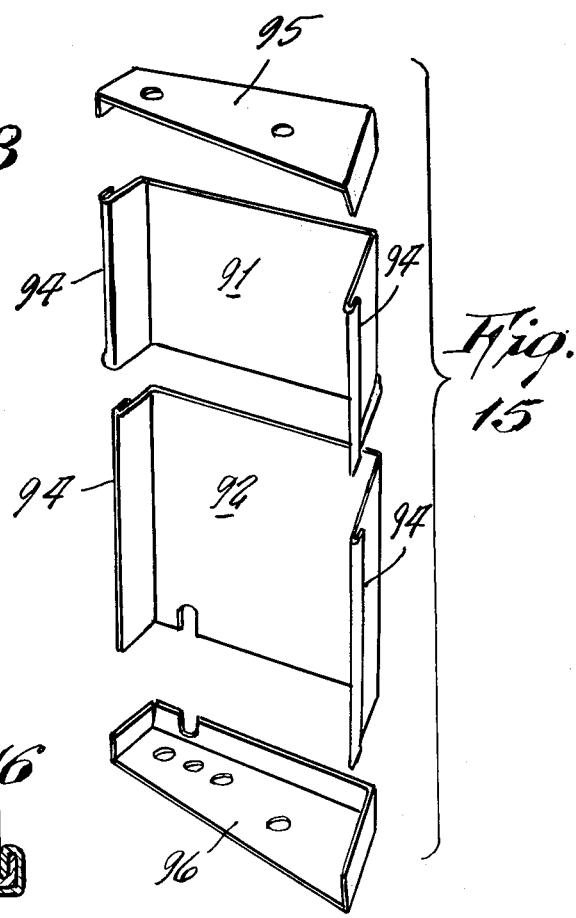

CABLE KIT FOR MAKING A REMOTE CONTROLLED TRUCK MIRROR

This invention relates generally to kits. More specifically, it relates to a kit which is mountable on a truck cab, and extends between a side view mirror and a dashboard of the truck.

A principal object of the present invention is to provide a cable kit, which converts a conventional truck side view mirror to a remote controlled truck mirror, so that it can be adjusted by the vehicle driver, comfortably, from the interior of the truck cab, without the necessity of reaching outwardly, physically, for accomplishing the same.

Another object of the present invention is to provide a kit, which will enable a driver of a large vehicle to observe traffic much better than could be done with mirrors of the prior art.

Another object of the present invention is to provide a kit, which can be readily adapted to both right and left side view mirrors of the vehicle, so that the driver has positive control of both.

Yet another object is to provide a kit, which is readily adaptable for use with various types of mirrors, including also mirrors of two or three-faced type, or which can be incorporated with mirrors that include a wind guard, or a mirror guard protector.

Other objects are to provide a kit, which is simple in design, inexpensive to manufacture, rugged in construction, easy to use, easy to install, and which is efficient in operation.

These, and other objects, will be readily evident, upon a study of the following specification, and the accompanying drawings, wherein:

FIG. 7 is a fragmentary front view of a vehicle, showing another modified form of the invention;

FIG. 8 is a view taken along lines 8—8 of FIG. 7;

FIG. 9 is a view taken along lines 9—9 of FIG. 8;

FIG. 10 is a side view of the mirror member illustrated in FIG. 9;

FIG. 11 is a fragmentary view of an interior of the vehicle, showing support means for a control rod of FIG. 7, and illustrating in phantom lines an alternate position thereof;

FIG. 12 is a perspective view, showing another modified mirror;

FIG. 13 is a perspective view of a mirror guard protector, used with mirrors that can be incorporated with the present invention;

FIG. 14 is a perspective view of another design of mirror guard protector, which is telescopically adjustable;

FIG. 15 is a perspective exploded view of the structure used in the construction of the mirror guard protector illustrated in FIG. 14;

FIG. 16 is a cross-sectional view, taken on line 16—16 of FIG. 14;

FIG. 17 is a perspective view of a three-faced type mirror, that can be accommodated by the present invention, and FIG. 18 is a side elevation view of the mirror shown in FIG. 17.

Figure 1:
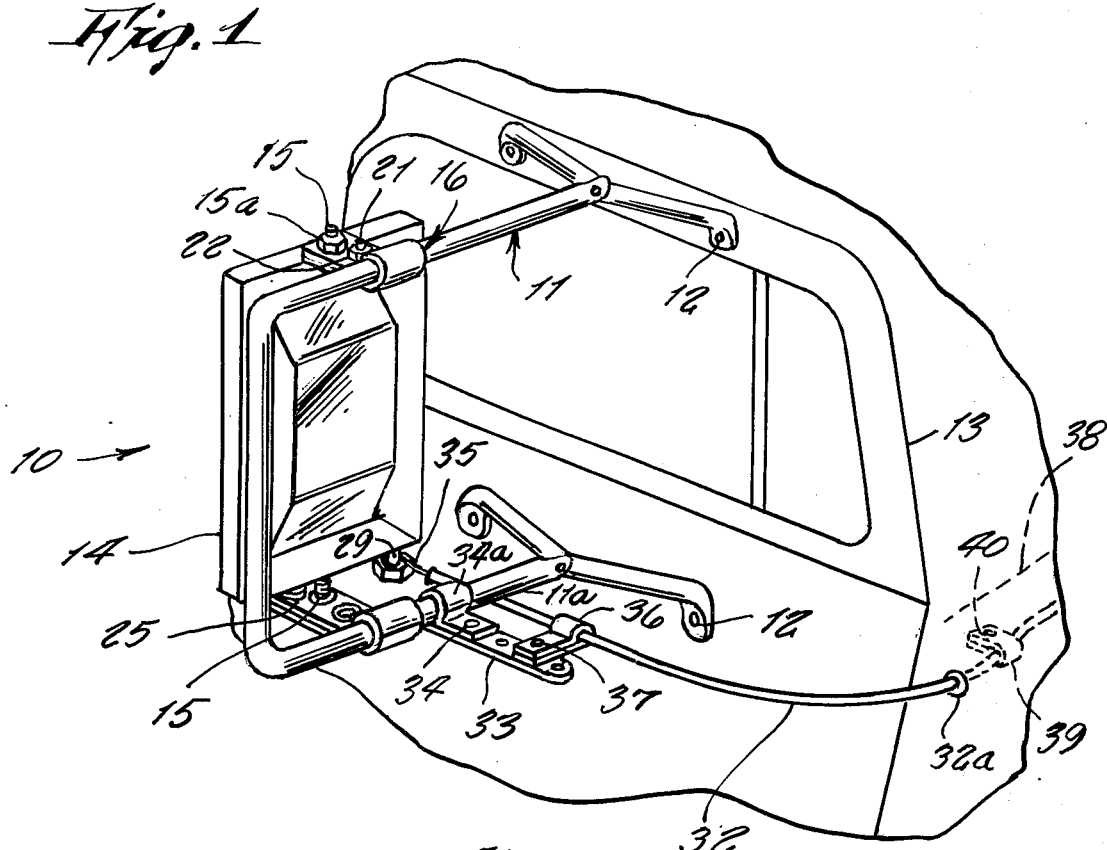
FIG. 1 is a perspective view of a preferred embodiment of the present invention.

Reference is now made to the drawings in greater detail, and more particularly to FIGS. 1 through 4 thereof at this time, wherein the reference numeral 10 represents a truck mirror supported within a tubular support 11. A plurality of suitable fasteners 12 provides a means of securing mirror 10 to a truck door 13. The mirror frame 14 is provided with outwardly extended bolt means 15. A bracket 16 is received on tubular support 11, freely receiving extending bolts 15 within opening 17, the mirror frame 14 being secured thereto by means of nuts 15a. A bolt fastener 18 through bracket 16 receives nut 19 against washer 20, and a bolt 21, through bracket 16, receives nut 22 against washer 23. The nut 22, on brackets 16 and 17a, provides a means of raising or lowering the mirror frame 14 as needed, when installing the truck mirror 10.

A bracket 17a is provided with an opening 24, which receives extending bolt 15 on the bottom end of mirror frame 14. A bolt 25, through bracket 17, receives washer 26, against which nut 27 abuts, the bolt 25 being slidably adjustable, when necessary, within the elongated slot opening 28.

A screw 29, near a bottom end of mirror frame 14, serves to retain loop 35 of the end of cable 31, which is encased with plastic sleeve 32. A bracket 33, secured by suitable fastener 34 and bracket 34a, to a leg 11a of tubular support 11, is provided. A cable clamp 36 clamps around sleeve 32 of cable 31, so as to secure it to bracket 33. A fastener 37 secures the clamp to the bracket. Plastic sleeve 32 of cable 31 extends through opening 32a of the truck body, and is supported within the interior of the truck cab by suitable clamps 39, secured under dashboard 38 by means of fasteners 40. A clamp 41 serves to retain sleeve 32 additionally, so as to enable the driver to manipulate the control knob 42, secured to the end of cable 31. Clamp 41 is secured fixedly to gear shift 43 by means of fastener 41a and a coiled spring 44, fitted around the end of cable 31, abuts at one end against the control knob 42, and at its opposite end abuts against a flange 44a, stationarily positioned adjacent the clamp 41, so as to serve as a return spring for the mirror frame.

It shall be noted, that the present invention may be constructed so as to be adaptable for use on a rear of a trailer, which will enable the driver to back the vehicle out into traffic.

It shall also be noted, that the instant invention may be so constructed, in order to be controlled by a floor mounted foot pedal means.

Figure 2:
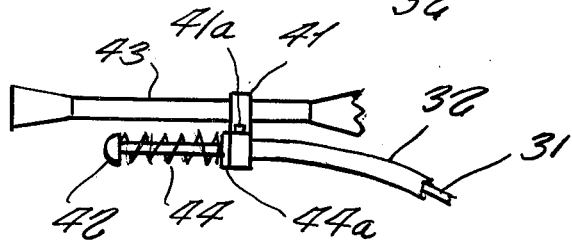
FIG. 2 is a fragmentary side view, showing an optional possibility of securing the operating cable to a shift lever of the truck.
Figure 3:
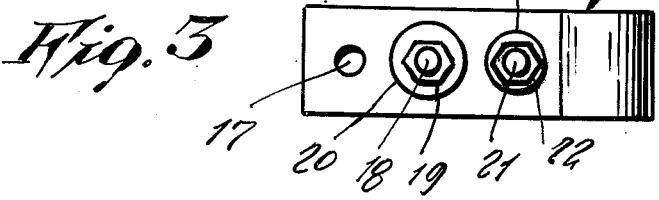
FIG. 3 is an enlarged top view of the upper mounting bracket, shown removed from the structure of FIG. 1.
Figure 4:
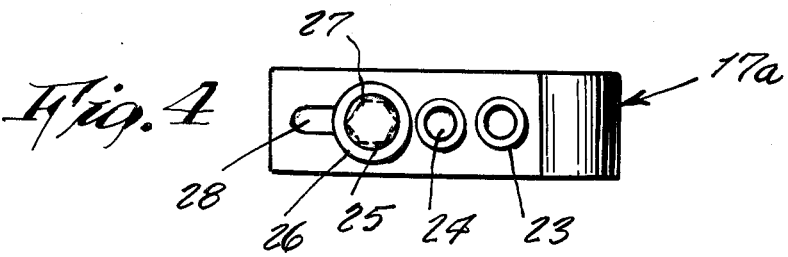
FIG. 4 is an enlarged top view of a lower bracket, shown removed from the structure of FIG. 1.

It is to be further noted, that the mounting of the cable to the gear shift, as illustrated in FIG. 2, is only optional, as it may be desirable only in some instances, but not in all. Accordingly, the cable end may be left independent of the gear shift, as will be described in FIG. 5.

Also, the above described looping of the cable 31 at 35 can be substituted by drilling a hole in the bottom of the mirror frame, and the end of the cable then being pushed straight up into the opening, for securement to the mirror frame, as desired by a manufacturer.

Figure 5:
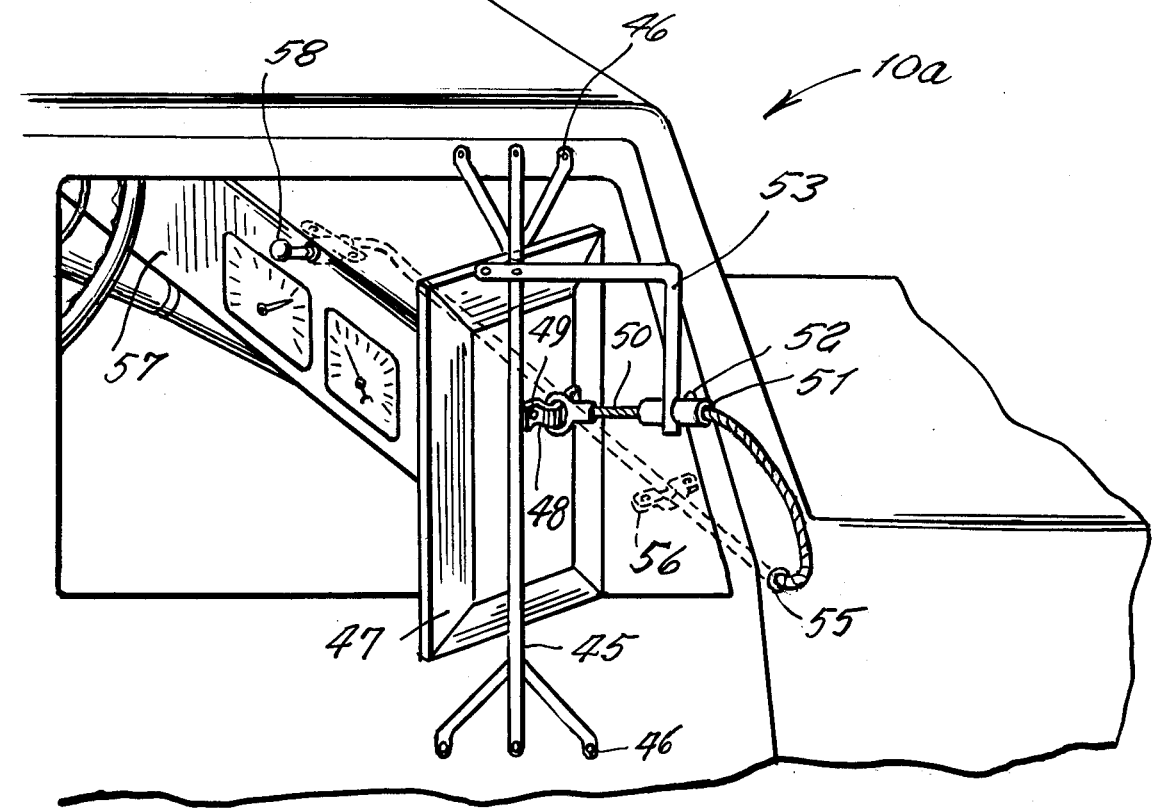
FIG. 5 is a perspective view of a modified form of the present invention, which illustrates an in-dashboard position for the control knob.

Referring now to FIG. 5 of the drawings, a remote controlled mirror 10a is suitably supported within tubular support 45, mounted to the vehicle by suitable fasteners 46. Secured to a rear side of mirror frame 47 is an offset clamp 48, fastened by suitable fasteners 49. A flexible cable 50 is received, and securely fastened within clamp 48, while a cable 50 is received within sleeve 51. The cable 50 is secured within sleeve 51 by means of a set screw 52, and sleeve 51 is fastened fixedly, in a suitable manner, to the end of an "L"-shaped arm 53, secured fixedly to the uppermost extremity of support 45 by fasteners 54. The flexible cable 50 extends through opening 55 of the truck, and is secured by clamps 56 under the dashboard 57. The end of the flexible cable 50 terminates with a knob 58, which, when urged inwardly or outwardly, will pivot the mirror 47 to any desired angle.

Figure 6:
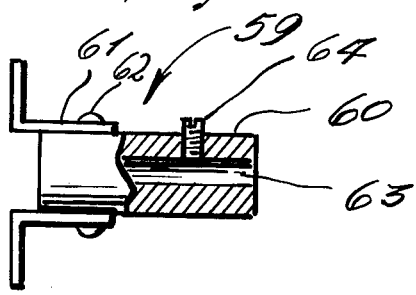
FIG. 6 is a side elevation view of a modified form of mirror clamp, the device being shown partly broken away.

Referring now to FIG. 6 of the drawings, a modified clamp 59, for holding cable 55, is shown to consist of a cylindrical sleeve 60, fastened by a pair of "L"-shaped brackets 61 with suitable fasteners 62. The cable 50 is received within opening 63, and is secured therein by means of a set screw 64.

In FIGS. 7 and 8, a modified form of remote controlled mirror 65 is pivotally supported within support member 66, fixedly secured to the vehicle by fasteners 67. A bracket 67a is secured to a rear of mirror frame 68, by means of fasteners 69. An end of bracket 67a is terminated by sleeve 70, in which is freely received a rod 71 of "L"-shaped configuration. The rod 71 is fastened to a rod 72, by means of a fastener 73. The rod 72 extends into the interior of the vehicle, and terminates with an eye 74, which freely receives an eye 75, formed at one end of a rod 76, which, at its opposite end 77, has a right angle bend for easy grasp thereof by a truck driver's hand.

Referring now to FIGS. 9 and 10, a double-faced mirror 69a provides for two angle vision. It is to be understood, that the mirror frame, shown in FIG. 9, is a same as the above described frame of mirror 14.

In FIG. 11, the rod 76, which is the control rod, is stored out of the way of the vehicle occupants, by means of a bracket 78, fastened within the vehicle by fasteners 79. An alternate storage position is shown by another bracket 78, for retaining the control rod 76, illustrated in phantom lines extending thereto.

In FIG. 12, a modified form of mirror frame 80 includes an arm 81, which is fixedly secured to a side edge 82, so as to perform a pivoting action to the mirror frame 80, by a suitable connecting rod.

In FIGS. 13 through 18, there are shown equipment to which the present invention can be readily incorporated. In FIG. 13, a mirror guard protector 90 is shown, and which may be used in pairs, so as to be used for each of the side mirrors of the vehicle. In FIG. 14, another mirror guard protector 90a is a same as mirror guard protector 90, except that, in this design, the mirror guard protector is made telescopic, as is clearly shown. The mirror guard protector 90a includes an upper member 91, which is slidable vertically, respective to lower member 92, by being fitted thereupon so that the two members can be readily moved apart, or toward each other, as indicated by arrows 93. Each of the members includes interfitting flanges 94, in order to slide respective to each other. In addition to the interslidable members 91 and 92, there is a top panel member 95, and a bottom member 96, that are securable to the upper and lower members by means of fasteners 97. The lower edge of the upper member 91 includes a rolled-over edge 98, for making an attractive finish thereto.

In FIGS. 17 and 18, there is shown a three-faced mirror 99, that includes central vertical mirror 100, and an adjustably inclined mirror 101, at each opposite upper and lower edge thereof. This type of mirror, shown also in FIG. 1, is readily adaptable for incorporation with the cable kit invention.

Thus, there are shown various assemblies, that are readily suitable for installation of the kit therewith.

While various changes may be made in the detail construction, it is understood that such changes will be within the spirit and scope of the present invention, as is defined by the appended claims.

What I now claim is:

1. A cable kit mounted on a truck, for making a remote controlled truck mirror, comprising, in combination, a mirror unit, said mirror unit being supported in a tubular support mounted on a truck door of a truck, and remote control means for rotating said mirror unit by a driver of said truck; said means comprising a mirror frame on said mirror unit having an outward extending bolt, an upper and a lower bracket on said tubular support each receiving said bolt within an opening thereof, a nut fastener on said upper bracket providing means to raise or lower said mirror frame, an offset set screw fastener near a bottom of said mirror frame, retaining a loop on an end of a cable enclosed in a plastic sleeve, a third bracket secured to a leg of said tubular support, a cable clamp supported on said third bracket grasping a longitudinally intermediate portion of said cable sleeve, and said sleeve of said cable extending through an opening of a body of said truck, said sleeve being secured to a dashboard of said truck; a control knob being secured to an end of said cable, a second clamp secured on said sleeve enabling a driver to manipulate said control knob secured on said end of said cable, said second clamp being secured fixedly to a gear shift, a coil received on said cable and abutting at one end with said control knob and abutting at its other end with a flange adjacent said second clamp.

2. The combination as set forth in claim 1, wherein said cable pulls or pushes said offset screw along a direction which is at an angle to a line of direction between said offset screw and said outward extending bolt.

3. The combination as set forth in claim 2, wherein said mirror is of multiple face type.

4. The combination as set forth in claim 3, wherein said multiple face mirror includes three flat mirror faces, an upper and lower of which are angularly inclined.

5. The combination as set forth in claim 3, wherein said mirror includes two flat mirror faces, a lower of which is angularly inclined.

6. The combination as set forth in claim 3, wherein said mirror is incorporated with a mirror guard protector.

* * * * *